May 1, 1951 L. WALDRON 2,551,073
INJECTOR FOR INTERNAL-COMBUSTION ENGINES
Filed Jan. 4, 1949 3 Sheets-Sheet 1
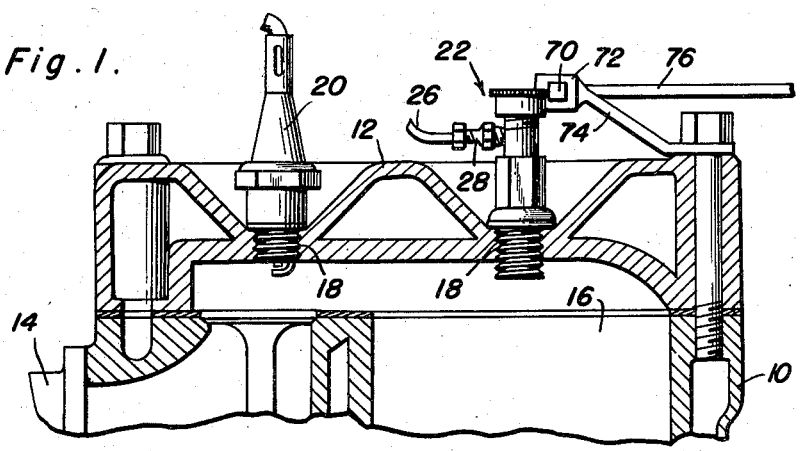
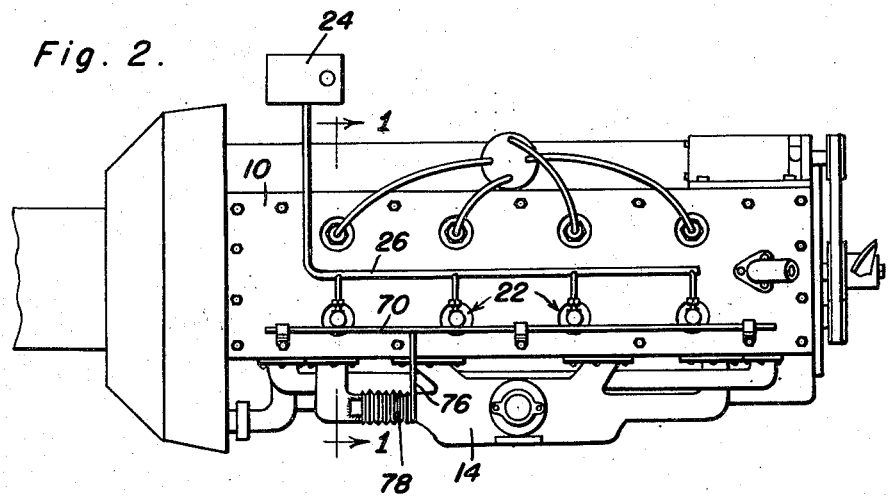
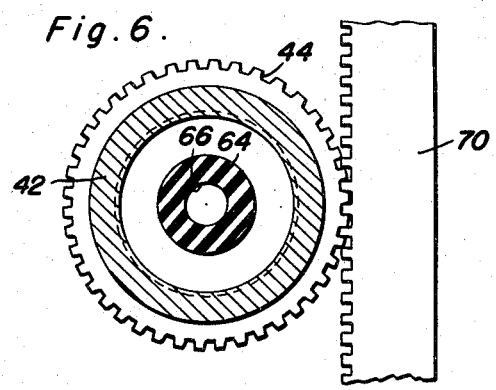
Inventor
Lincoln Waldron

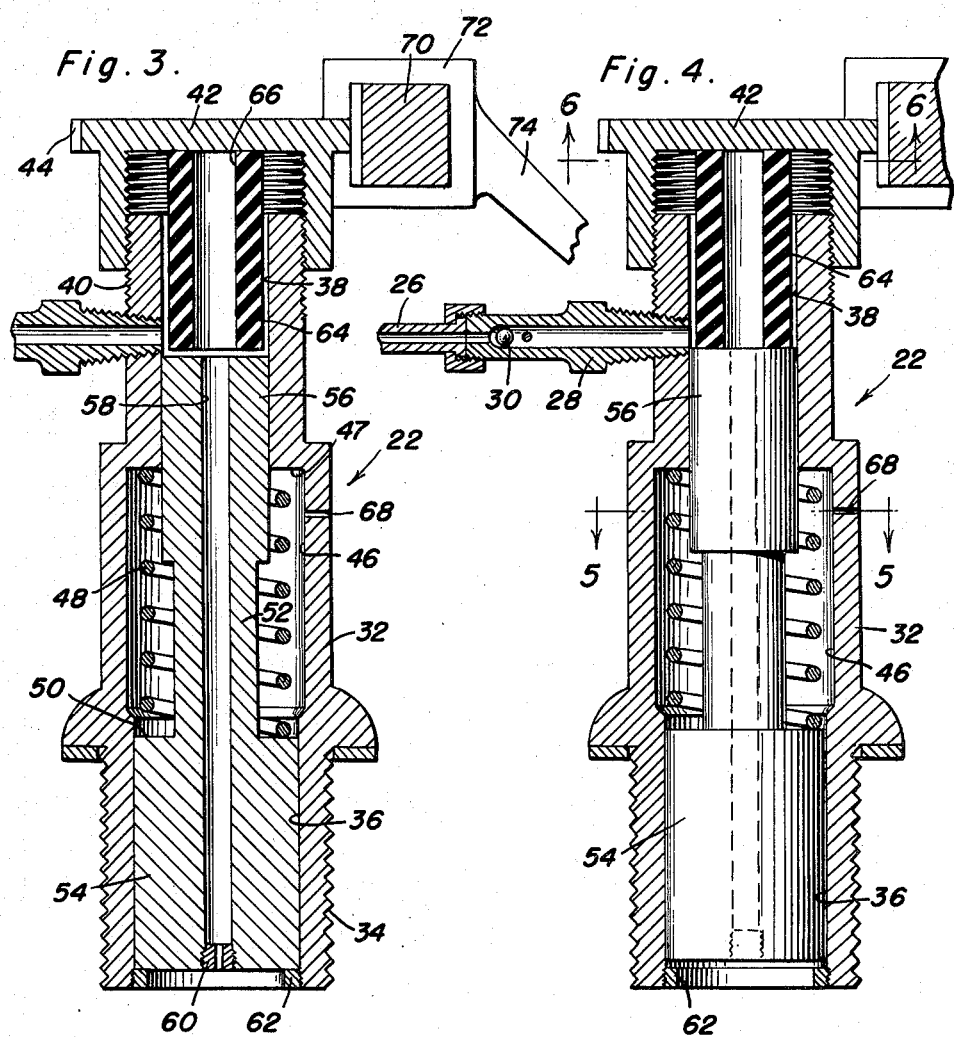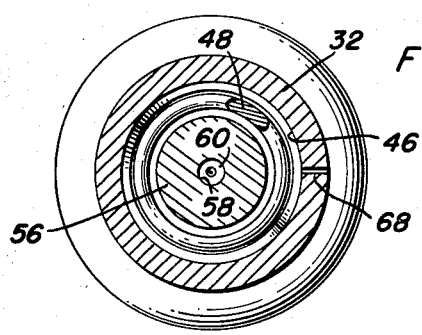
Fig. 3. Fig. 4. Fig. 5.
Inventor
Lincoln Waldron

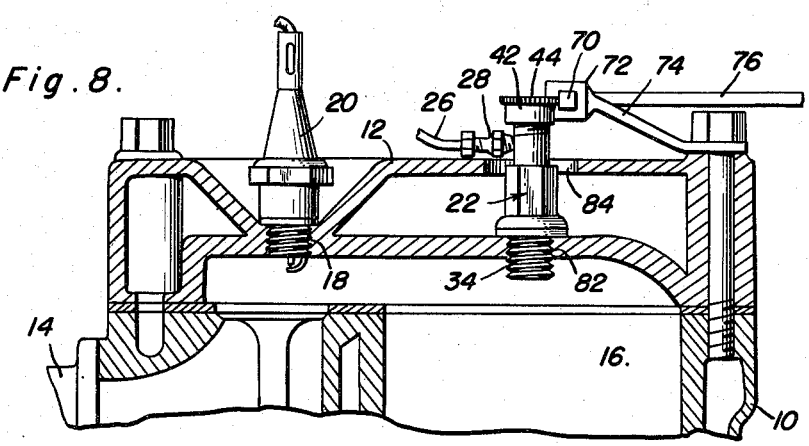
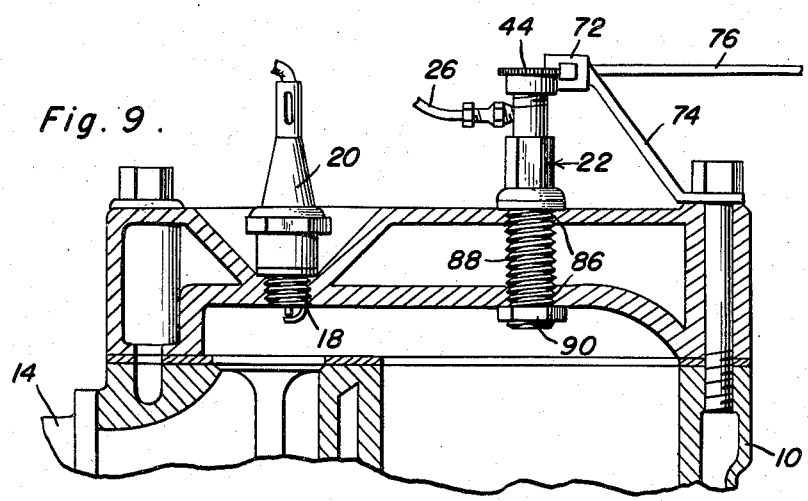
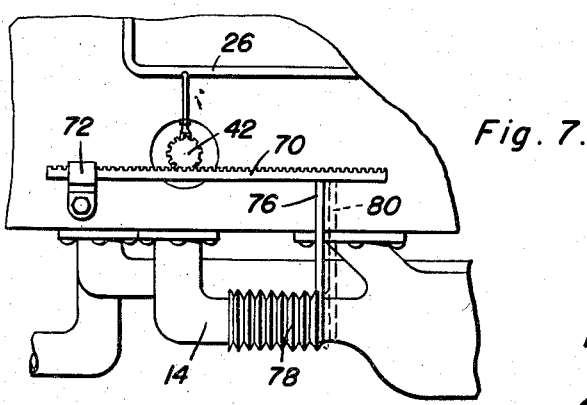

Patented May 1, 1951

2,551,073

UNITED STATES PATENT OFFICE 2,551,073

INJECTOR FOR INTERNAL-COMBUSTION ENGINES

Lincoln Waldron, West Nyack, N. Y.

Application January 4, 1949, Serial No. 69,126

20 Claims. (Cl. 123—25)

This invention comprises novel and useful improvements in an injector for internal combustion engines and more specifically pertains to an explosion operated liquid injector for the combustion chambers of internal combustion engines.

The primary object of this invention is to provide an improved automatic injector for discharging liquids into the combustion chambers of internal combustion engines in response to the explosion pressures thereof.

A further object of the invention is to provide an internal cooling system for an internal combustion engine wherein the temperature of the engine may be regulated and kept within predetermined limits.

A further object of the invention is to provide a method and apparatus for automatically maintaining the temperature of internal combustion engines within predetermined limits.

A still further object of the invention is to provide an internal cooling system for internal combustion engines for maintaining their temperature within predetermined limits, either as an adjunct to or as a replacement for conventional cooling systems.

Yet another object of the invention is to provide an injection apparatus which may be readily applied to existing constructions of internal combustion engines, or may be secured thereto with a minimum of labor and alterations.

An important feature of the invention resides in the provision of an injector casing which may be readily applied to a stop plug opening or an equivalent threaded opening of an internal combustion engine and which contains an injector pump therein and an explosion pressure operated piston for actuating said pump, for automatically injecting a cooling fluid to the combustion chamber of an engine in quantities which are proportionate to the explosion pressure of the engine and which may be varied in response to temperature variations of the engine.

A still further feature of the invention resides in providing an injection apparatus wherein the reciprocating injector piston is provided with a yielding stop for cushioning the action of the same, which stop further functions as part of a control valve for regulating the delivery of the injector.

A still further feature of the invention resides in the provision of a novel rack and pinion adjusting means, controlled by a thermostat in response to temperature variations of an engine for regulating an abutment for the yielding stop of the injector piston.

And a final important feature and object of the invention is to provide an automatic injector which may be readily employed to inject water or any other cooling liquid into the combustion chamber of an engine for internally cooling the same either as an adjunct to or as a replacement for conventional cooling systems, which shall be easily and readily applied to conventional forms of engines, will be automatic in its operation, and readily adjusted to meet a variety of conditions during operation of the engine.

These, together with various ancillary features and objects of the invention which will later become apparent as the following description proceeds, are attained by this device, preferred embodiments of which have been illustrated by way of example only in the accompanying drawings, wherein:

Figure 1 is a fragmentary vertical central sectional view through a portion of an internal combustion engine of the so-called dual ignition type and showing the principles of the invention applied thereto; taken substantially upon the plane of the section line 1—1 of Figure 2.

Figure 2 is a top plan view of the invention as applied in Figure 1;

Figure 3 is a central vertical longitudinal sectional view taken upon an enlarged scale and showing the internal construction of the liquid injector, the device being shown in its normal rest or inoperative position;

Figure 4 is a view similar to Figure 3 but showing the parts at the end of the injection period of the device;

Figure 5 is a vertical horizontal sectional detail view taken substantially upon the plane of the section line 5—5 of Figure 4;

Figure 6 is a horizontal sectional fragmentary detail view taken substantially upon the plane of the section line 6—6 of Figure 4 and showing the rack and pinion adjusting means for regulating the quantity of the liquid injection;

Figure 7 is a fragmentary top plan view upon an enlarged scale of a portion of Figure 2, illustrating more clearly the mounting of the thermostatic control of the injector regulating means in accordance with this invention;

Figure 8 is a view similar to Figure 1 but illustrating the invention applied to a conventional form of engine having but a single spark plug and in which the cooling water jacket of the engine has been rendered inoperative; and Figure 9 is a view similar to Figure 1 but showing the invention further applied to a conventional form of engine having a single spark plug therein, and wherein the internal cooling system is employed as a supplement to the water jacketing cooling system of the engine.

Referring now more specifically to the accompanying drawings wherein like numerals designate similar parts throughout the various views, attention is directed first to the embodiment of the invention illustrated in Figures 1–7. However, it is noted that in each of the embodiments illustrated in Figures 1, 8 and 9, the numeral 10 designates any conventional form of water jacketed or air jacketed cylinder block of an internal combustion engine which is preferably provided with a detachable cooling jacketed head 12, the engine having a conventional exhaust manifold 14 and combustion chamber 16 therein.

Referring now more specifically to the embodiment of Figures 1–7, it will be seen that the invention has been shown applied to a type of internal combustion engine having a dual ignition system, that is one in which the cylinder head is provided with a pair of spark plug openings 18 for receiving a pair of spark plugs 20 therein. The present invention makes use of one of the spark plug openings, for securing and inserting therein the injector indicated generally by the numeral 22 which forms the subject of this invention, the dual ignition system being then changed to a single plug ignition system in a manner well understood in the prior art.

It should be here understood that the invention comprehends the employing of an internal cooling system by injecting a cooling liquid into a combustion chamber during the period of combustion for internally cooling the engine and thereby supplementing or, if desired, replacing the conventional cooling system with which the engine is provided. As shown in Figure 1, the cooling jackets of the block 10 or head 12 remain unimpaired and are capable of being employed for their intended function if desired; although the same may be drained of their cooling medium, whereby the injector 22 constitutes the sole cooling means of the engine.

Any suitable cooling liquid may be injected into the combustion chamber for the purpose intended, and water is inexpensive, and highly satisfactory for these purposes. However, other suitable liquids may be injected, such as alcohol, or those liquids which have both a fuel value and which would vaporize when in the combustion chamber and will absorb heat therefrom to promote internal cooling. Further, the device may be employed for automatically injecting other liquids into the combustion chamber for a variety of purposes, such as for lubrication, for carbon removal, for anti-knock purposes, or for various combustion regulating purposes as desired.

When water is employed as the coolant, the same may, in some instances, be obtained from the radiator or other portions of the cooling system of a water-cooled engine; but it is preferred to provide a separate source of supply such as the container or tank 24, which, by means of a conduit system 26, conducts the coolant or the liquid to the individual injectors 22. In this manner, the injector is independent of the engine cooling system for its liquid, and is also available for interchangeably injecting other liquids than water into the combustion chamber.

As will be more apparent from Figure 4, the conduit system 26 is connected to the individual injectors 22 by means of an interposed nipple fitting 28 which may be conveniently provided with a non-return valve 30 of any suitable type, such, for example, as a ball check valve. The function of this valve is to permit flow of liquid into the injector, but to prevent return flow from the injector back to the source of liquid supply.

Reference is now made more particularly to Figures 3 and 4 for an understanding of the construction of the injector unit. The latter may conveniently consist of a one-piece casing or housing 32 having one end externally threaded, as at 34, for reception in a spark plug opening 18 or a similar bore communicating with the interior of the combustion chamber 16. The casing 32 consists of a hollow body open at its ends, and providing at its opposite extremities internal cylindrical bores 36 and 38 which respectively constitute pressure actuating and injector pump chambers. The other end of the casing is likewise externally threaded, as at 40, for the reception of an adjusting nut 42 whose inner surface constitutes an adjusting abutment for a purpose to be subsequently set forth, while the periphery of this nut is provided with serrations or teeth 44 whereby the head of the nut constitutes a pinion by means of which the latter may be rotatably adjusted upon the screw threads 40.

Intermediate the cylindrical chambers 36 and 38, the interior of the casing 32 is enlarged or counterbored to provide a chamber 46 which is provided with a shoulder 47 where the chamber merges into the injector chamber 38.

Received in the chamber 46 and seated against the shoulder 47 at one end is a compression spring 48 whose other extremity seats against a shouldered portion 50 of a reciprocating member 52 which is received within the casing 32.

The member 52 is provided at its ends with cylindrical portions providing an enlarged actuating piston 54 reciprocable in the actuating chamber 36 and an injector pump piston 56 which is reciprocable in the injector chamber 38. The reciprocating member 52 thus is integrally provided with an actuating plunger or piston and an actuated injector piston.

The reciprocating member 52 is further provided with a preferably axial bore or passage 58 extending from one end thereof to the other, which serves as a liquid discharge passage for the device, the upper end of this passage communicating with the injector chamber 38, while the lower end thereof communicates by means of an injection nozzle 60 with the lower end of the actuating chamber 36 and consequently the interior of the combustion chamber 16.

As will be readily apparent, the reciprocating member 52 may be inserted into the casing 32 from the lower end thereof, that is through the open end of the actuating chamber 36, and is retained therein, as by a screw-threaded gland or ring 62.

It will thus be seen that the spring 48 urges the reciprocating member outwardly and downwardly of the casing 32, to thereby increase the size of the injector chamber 38 and diminish the size of the actuating chamber 36, and it is contemplated that this compression spring shall be of such strength as to prevent inward movement of the reciprocating member 52 except when the pressure within the combustion chamber 16 reaches the strength of an explosion. Thus, the actuating plunger or piston and the injector pump piston remain idle throughout the intake or suction stroke, the compression stroke of the engine, but are moved or reciprocated inwardly of the device upon the occurrence of an explosion in the combustion chamber. As will be readily understood, the extent of this inward movement, which is occasioned by the pressure applied to the exposed end of the actuating piston 54 by the exploded gases in the combustion chamber 16, is proportional to the total force of the explosion whereby the amplitude of stroke of the injector pump piston 56 is proportional to the explosive pressure of the engine, except as regulated and limited by a stop means to be now described.

Received within the injector chamber 38 is a yieldable or cushioning stop member 64 which is preferably in the form of a tubular or sleeve-like member having an axial bore 66 which is aligned with the bore 58 of the reciprocating member 52.

As will be seen, the lower end of the stop member 64 is adapted to be engaged by the upper end of the pump piston 56 when the latter is in its fully raised position, as shown in Figure 4, while when the reciprocating member is in its idle or lowered position, a slight clearance will exist between the adjacent ends of the stop member 64 and the piston 56, as shown in Figure 3.

The sleeve 64 is preferably carried by the inner surface of the abutment member 42 so that by rotatably adjusting the latter upon the screw threads 40, the clearance between the sleeve 64 and the adjacent surface of the pump piston 56 may be adjusted or regulated.

As will be readily seen, the outside diameter of the stop 64 is less than the internal diameter of the chamber 38 to provide a slight annular space therebetween, and the nipple 28 communicates with this space adjacent but slightly above the lower end of the sleeve 64, for supplying liquid into the injector chamber.

It will now be seen that when the compression spring 48 moves the reciprocating member 52 to its lower position, that is, from the position shown in Figure 4 to the normal or inoperative position shown in Figure 3, the outward movement of the pump piston 56 in the injector chamber 38 will enlarge the volume of the latter, and thereby create a suction which will unseat the non-return valve 30 and draw in a further charge of liquid to again fill the pump chamber. Upon the inward stroke of the pump piston 56 in response to actuation of piston 54 by the explosion pressure within the combustion chamber, the liquid within the injector chamber will be compressed, and thereby maintain the non-return valve 30 closed, so that the compressed liquid will be forced through the liquid delivery or injecting channel 58 and nozzle 60 into the combustion chamber 16, thereby spraying the coolant into the burning gases. This injection will continue until the upper end of the piston 56 contacts the lower end of the sleeve 64, at which time communication of the delivery conduit 58 with the injector chamber is cut off by the valving action of the cushioning or resilient stop 64. Injection also may be cut off by complete closure of the gap through turning down abutment until stop contacts the upper end of piston 56.

Obviously, the desired cushioning or yielding action of the sleeve 64 may be obtained in different ways, but it has been found to be satisfactory for the purposes of this invention to form this sleeve of a yielding material such as rubber or the like.

It should be here emphasized that the pressure of the spring 48 may be so chosen that for a given setting or adjustment of the adjusting abutment 42, a varying quantity of liquid will be injected in accordance with the force of the explosion pressure. If desired, the casing 32 may be provided with a vent 68 which serves to prevent a dashpot action in the chamber 46 above the shoulder 50.

Since the primary purpose of this invention is to maintain the temperature of the engine within predetermined limits, it is obvious that some adjusting means which will regulate the quantity of liquid injected in accordance with engine temperature will render the device more adaptable to varying engine conditions and more automatic in its operation. For this purpose, there is provided a thermostatically controlled system for rotatably adjusting the abutment member 42. This system includes a rack bar 70 which may constitute a single member extending the length of the engine and suitably guided in bearings or guides 72 mounted upon brackets 74 upon the head of the engine, or may consist of a plurality of separate members mechanically connected for simultaneous operation, but whereby the individual rack bars may be individually or independently adjusted for individually controlling the temperatures of the different cylinders.

The rack bar 70 will thus be continuously in mesh with the pinion teeth 44 of the adjusting member 42, whereby reciprocation of the rack bar will result in rotation of the member 42 and thereby alter the clearance between the end of the abutment 64 and the adjacent surface of the pump piston 56.

This rack bar and pinion construction is shown more clearly in the detail view of Figure 6. The means for reciprocating or actuating the rack bar is disclosed in Figure 7 and may conveniently consist of a laterally extending operating arm 76 rigidly or otherwise carried by the rack bar 70, which arm is, in turn, carried by one end of a thermostat 78 which may be of the bellows or any other convenient type, the other end of this thermostat being anchored or secured to the exhaust manifold 14 in any desired manner. It will thus be seen that as the thermostat expands upon a temperature increase in the engine, it will move the actuating arm 76, as to the dotted line position 80 of Figure 7, thereby drawing the rack bar 70 with a rectilinear motion to the right as viewed in that figure, and thus rotating by means of the pinion 44, the abutment member 42. Obviously, the action of the thermostat may be calibrated to other characteristics of the device, whereby the quantity of coolant injected may be regulated to maintain a predetermined desired temperature. Obviously, by individually adjusting the abutment 42 and stop 64 with respect to the rack bar 70, the range throughout which the automatic temperature control means operates may be regulated for the entire engine and for the individual cylinders.

Although the temperature responsive means has been indicated as consisting of a thermostat in association with the exhaust manifold, it is obvious that various other temperature-responsive controls may be employed and which are sensitive to temperature variations of other portions of the engine as desired.

Referring now to the embodiment of Figure 8, it will be seen that the same identical mechanism is employed as in the embodiment of Figures 1–7, except that the cylinder head 12 is of a conventional type having but a single spark plug opening 18 with a spark plug 20 therein.

In applying the injector to such an engine, it therefore becomes necessary to form a new opening through the water jackets of the cylinder head in order to establish communication with the combustion chamber. For this purpose, the inner wall of the water jacket is apertured and threaded, as at 82, to receive the screw-threaded end 34 of the injector 22, while the outer wall may be apertured or cut away, as at 84, to provide ample clearance for the upper end of the injector. In this construction, obviously the water jacket in the head 12 is rendered inoperative, and the device in this installation is intended to replace entirely the cooling jacket system with which the engine was originally equipped. In operation, the device is identical with that previously set forth.

Attention is next directed to the embodiment of Figure 9 wherein an arrangement is disclosed for applying the device to a conventional engine as a supplement to rather than a replacement for the conventional system thereof. In this arrangement, the water jacket of the cylinder head 12 is apertured and a water-tight seal with the apertures and the injector 22 is established in any desired manner, such as by welding, gasketing and the like. In one satisfactory arrangement, these apertures are threaded, as at 86, to provide aligned openings for receiving the threaded extremity 88 of the injector 22. For this purpose, the threaded portion will probably be of greater length than that illustrated in Figures 3 and 4 and in the other embodiments in view of the desirability of establishing a threaded and water-tight seal with the inner and outer walls of the water jacket of the cylinder head. To further increase this sealing action, a sealing or packing nut 90 may be provided upon the screw-threaded portion 88 on the inner surface of the inner jacket wall.

In this arrangement, the cooling jacket of the head and cylinder may function in their intended manner, and the injector and its associated mechanism is of the same identical construction set forth with regard to the embodiment of Figures 1-7. However, it will be appreciated that since in this embodiment the injector merely supplements the action of the cooling system instead of completely replacing the same, that the volume of liquid injected will probably be considerably less than in the previous embodiments, whereby the proportions of the various movable parts will necessarily be altered or their movement adjusted to effect the desired temperature control.

From the foregoing, the construction and operation of the device will be readily understood and further explanation thereof is believed to be unnecessary. However, since numerous modifications and changes will readily occur to those skilled in the art after a consideration of the foregoing specification and accompanying drawings, it is not desired to limit the invention to the exact constructions shown and described, but all suitable modifications and equivalents may be resorted to falling within the scope of the appended claims.

Having thus disclosed and described the invention, what is claimed as new is as follows:

1. A device for injecting liquid into the combustion chamber of an internal combustion engine comprising a casing communicating with an engine combustion chamber, an injector pump in said casing operable by explosion pressure of said combustion chamber, a liquid inlet to said injector pump, a combined pump stop and liquid delivery valve in said casing, and adjusting means externally of said casing for said stop to regulate the quantity and delivery of said pump.

2. A device for injecting liquid into the combustion chamber of an internal combustion engine comprising a casing communicating with an engine combustion chamber, an injector pump in said casing operable by explosion pressure of said combustion chamber, a liquid inlet to said injector pump, a combined pump stop and liquid delivery valve in said casing, adjusting means externally of said casing for said stop to regulate the quantity and delivery of said pump, and means responsive to variations in engine temperature for controlling said adjusting means.

3. The combination of claim 1 wherein said casing has oppositely disposed cylinders comprising actuating and pump chambers, a reciprocating member having pistons slidable in each of said chambers, resilient means urging said member in a direction to enlarge said pump chamber and diminish said actuating chamber, said member having a liquid discharge passage therein connecting said chambers.

4. The combination of claim 1 wherein said injector pump comprises an injector cylinder and a piston slidable therein, a liquid discharge passage in said piston connecting said injector chamber with the engine combustion chamber and means responsive to explosion pressure pulsations for actuating said pump piston.

5. The combination of claim 1 wherein said injector pump comprises an injector chamber having a liquid displacing member, means for supplying liquid to said chamber, conduit means for delivering liquid from said injector chamber to an engine combustion chamber and means for adjusting the delivery from said injector chamber, said last means comprising a yielding stop for limiting movement of said displacing member.

6. The combination of claim 1 wherein said injector pump comprises an injector chamber having a liquid displacing member, means for supplying liquid to said chamber, conduit means for delivering liquid from said injector chamber to an engine combustion chamber and means for adjusting the delivery from said injector chamber, said last means comprising a yielding stop for limiting movement of said displacing member, said stop comprising a sleeve, an adjustable abutment, said sleeve being terminally engageable by said abutment and said displacing member, said abutment regulating the clearance between said sleeve and said displacing member.

7. The combination of claim 1 wherein said injector pump comprises an injector chamber having a liquid displacing member, means for supplying liquid to said chamber, conduit means for delivering liquid from said injector chamber to an engine combustion chamber and means for adjusting the delivery from said injector chamber, said last means comprising a yielding stop for limiting movement of said displacing member, said stop comprising a sleeve, an adjustable abutment, said sleeve being terminally engageable by said abutment and said displacing member, said abutment regulating the clearance between said sleeve and said displacing member, said conduit means extending through said displacing member, said sleeve surrounding said conduit.

8. The combination of claim 1 wherein said injector pump comprises an injector cylinder and a piston slidable therein, a liquid discharge passage in said piston connecting said injector chamber with the engine combustion chamber and means responsive to explosion pressure pulsations for actuating said pump piston, said stop comprising a sleeve, an adjustable abutment, said sleeve terminally engageable with said abutment and pump piston, said abutment regulating the clearance between said sleeve and said pump piston.

9. The combination of claim 1 wherein said injector pump comprises an injector cylinder and a piston slidable therein, a liquid discharge passage in said piston connecting said injector chamber with the engine combustion chamber and means responsive to explosion pressure pulsations for actuating said pump piston, said stop comprising a sleeve, an adjustable abutment, said sleeve terminally engageable with said abutment and pump piston, said abutment regulating the clearance between said sleeve and said pump piston, said sleeve surrounding said discharge passage.

10. The combination of claim 1 wherein said casing has oppositely disposed cylinders comprising actuating and pump chambers, a reciprocating member having pistons slidable in each of said chambers, resilient means urging said member in a direction to enlarge said pump chamber and diminish said actuating chamber, said member having a liquid discharge passage therein connecting said chambers, and means responsive to variations in engine temperature for controlling said adjusting means.

11. The combination of claim 1 wherein said injector pump comprises an injector cylinder and a piston slidable therein, a liquid discharge passage in said piston connecting said injector chamber with the engine combustion chamber and means responsive to explosion pressure pulsations for actuating said pump piston and means responsive to variations in engine temperature for controlling said adjusting means.

12. The combination of claim 1 wherein said injector pump comprises an injector chamber having a liquid displacing member, means for supplying liquid to said chamber, conduit means for delivering liquid from said injector chamber to an engine combustion chamber and means for adjusting the delivery from said injector chamber, said last means comprising a yielding stop for limiting movement of said displacing member, and means responsive to variations in engine temperature for controlling said adjusting means.

13. The combination of claim 1 wherein said injector pump comprises an injector chamber having a liquid displacing member, means for supplying liquid to said chamber, conduit means for delivering liquid from said injector chamber to an engine combustion chamber and means for adjusting the delivery from said injector chamber, said last means comprising a yielding stop for limiting movement of said displacing member, said stop comprising a sleeve, an adjustable abutment, said sleeve being terminally engageable by said abutment and said displacing member, said abutment regulating the clearance between said sleeve and said displacing member, and means responsive to variations in engine temperature for controlling said adjusting means.

14. The combination of claim 1 wherein said injector pump comprises an injector chamber having a liquid displacing member, means for supplying liquid to said chamber, conduit means for delivering liquid from said injector chamber to an engine combustion chamber and means for adjusting the delivery from said injector chamber, said last means comprising a yielding stop for limiting movement of said displacing member, said stop comprising a sleeve, an adjustable abutment, said sleeve being terminally engageable by said abutment and said displacing member, said abutment regulating the clearance between said sleeve and said displacing member, said conduit means extending through said displacing member, said sleeve surrounding said conduit, and means responsive to variations in engine temperature for controlling said adjusting means.

15. The combination of claim 1 wherein said injector pump comprises an injector cylinder and a piston slidable therein, a liquid discharge passage in said piston connecting said injector chamber with the engine combustion chamber and means responsive to explosion pressure pulsations for actuating said pump piston, said stop comprising a sleeve, an adjustable abutment, said sleeve terminally engageable with said abutment and pump piston, said abutment regulating the clearance between said sleeve and said pump piston, and means responsive to variations in engine temperature for controlling said adjusting means.

16. The combination of claim 1 wherein said injector pump comprises an injector cylinder and a piston slidable therein, a liquid discharge passage in said piston connecting said injector chamber with the engine combustion chamber and means responsive to explosion pressure pulsations for actuating said pump piston, said stop comprising a sleeve, an adjustable abutment, said sleeve terminally engageable with said abutment and pump piston, said abutment regulating the clearance between said sleeve and said pump piston, said sleeve surrounding said discharge passage, and means responsive to variations in engine temperature for controlling said adjusting means.

17. The combination of claim 1 wherein said injector pump comprises an injector chamber having a liquid displacing member, means for supplying liquid to said chamber, conduit means for delivering liquid from said injector chamber to an engine combustion chamber and means for adjusting the delivery from said injector chamber, said last means comprising a yielding stop for limiting movement of said displacing member, said stop comprising a sleeve, an adjustable abutment, said sleeve being terminally engageable by said abutment and said displacing member, said abutment regulating the clearance between said sleeve and said displacing member, and a rack and pinion for rotatably adjusting said abutment.

18. The combination of claim 1 wherein said injector pump comprises an injector chamber having a liquid displacing member, means for supplying liquid to said chamber, conduit means for delivering liquid from said injector chamber to an engine combustion chamber and means for adjusting the delivery from said injector chamber, said last means comprising a yielding stop for limiting movement of said displacing member, said stop comprising a sleeve, an adjustable abutment, said sleeve being terminally engageable by said abutment and said displacing member, said abutment regulating the clearance between said sleeve and said displacing member, and a rack and pinion for rotatably adjusting said abutment, and means responsive to variations in engine temperature for controlling said adjusting means.

19. The combination of claim 1 wherein said injector pump comprises an injector cylinder and a piston slidable therein, a liquid discharge passage in said piston connecting said injector chamber with the engine combustion chamber and means responsive to explosion pressure pulsations for actuating said pump piston, said stop comprising a sleeve, an adjustable abutment, said sleeve terminally engageable with said abutment and pump piston, said abutment regulating the clearance between said sleeve and said pump piston, and a rack and pinion for rotatably adjusting said abutment.

20. The combination of claim 1 wherein said injector pump comprises an injector cylinder and a piston slidable therein, a liquid discharge passage in said piston connecting said injector chamber with the engine combustion chamber and means responsive to explosion pressure pulsations for actuating said pump piston, said stop comprising a sleeve, an adjustable abutment, said sleeve terminally engageable with said abutment and pump piston, said abutment regulating the clearance between said sleeve and said pump piston, a rack and pinion for rotatably adjusting said abutment, and means responsive to variations in engine temperature for controlling said adjusting means.

LINCOLN WALDRON.

REFERENCES CITED

The following references are of record in the file of this patent:

UNITED STATES PATENTS

| Number | Name | Date |
|---|---|---|
| 795,422 | Thomson | July 25, 1905 |